Inventors
Merton Allen,
Edward C. Schrom,
by John M. Davis
Their Attorney.

United States Patent Office 3,517,674
Patented June 30, 1970

3,517,674
RUPTURE OF ADHESIVE BONDS
Merton Allen and Edward C. Schrom, Schenectady, N.Y., assignors to General Electric Company, a corporation of New York
Filed June 28, 1965, Ser. No. 467,251
Int. Cl. B08b 7/02
U.S. Cl. 134—1                                 9 Claims

ABSTRACT OF THE DISCLOSURE

Electrohydraulically generated shock waves are utilized to cause the rupture of a mechanical or adhesive bond securing a solid material to a solid substrate causing separation thereof without damaging the substrate. Clothes washing, cleaning of tableware, metal castings, stripping electrowon metals from electrodes, cleaning of tanks, ship hulls and the like by electrohydraulically generated shock waves is taught.

---

This invention relates to the separation of a solid material from a solid substrate and, more particularly to the use of a high energy rate shock wave propagated in and through a substantially incompressible fluid media to cause the rupture of a mechanical or adhesive bond securing a solid material to a solid substrate, causing separation thereof without causing damage to the substrate.

It is well known that many solid materials are subjected to uses in environments which promote the adhesive deposition on or attachment to their surfaces of solid materials which later require removal. The use of terms such as for example, "adhesive deposition," "adhesive bond," and "adhesion" is intended and will be understood to include composite structures of a solid material adherently secured to a solid material substrate which may be composed of a substance materially different from the former solid material or, in some cases, of the same material. However, in those cases where the two materials are composed of the same material, an interface usually exists between the two layers and solid state diffusion thereacross is substantially absent. The use of the term "solid material substrate" is intended to include substrates as widely divergent as relatively permeable textiles, such as woven as well as nonwoven fabrics, and relatively impervious substrates, such as metallic container and ship hulls, for example. The adherently attached materials may be purposely deposited upon such substrates, or may be so-deposited only as occasioned by normal use of the substrate, all as demonstrated subsequently. In any event, the circumstance frequently presents itself of a solid substrate having a solid adhesively bonded thereto wherein it is desirable to remove the adhesively bonded material without doing any substantial damage to the substrate, both in industrial and nonindustrial situations. Existing means for accomplishing this common end or result are known, but have previously involved expensive and time-consuming processes, as will be discussed in detail subsequently.

It is, therefore, a principal object of this invention to provide a means for separating solid materials adhesively bonded to solid substrates quickly and economically without doing substantial damage to the substrate.

It is a further object of this invention to provide a means for removing solid materials from solid substrates by breaking the adhesive bond therebetween without doing substantial damage to either the substrate material or to the overlying material.

Figure 1:
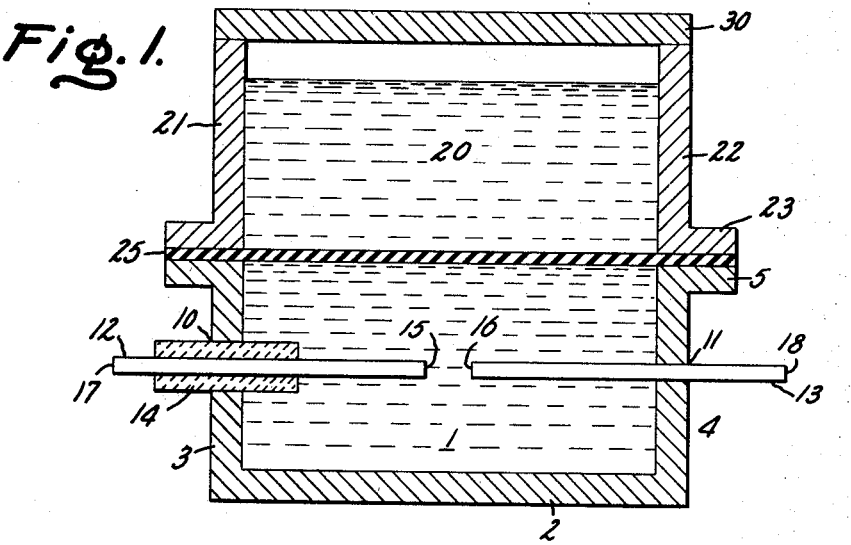
Figure 2:
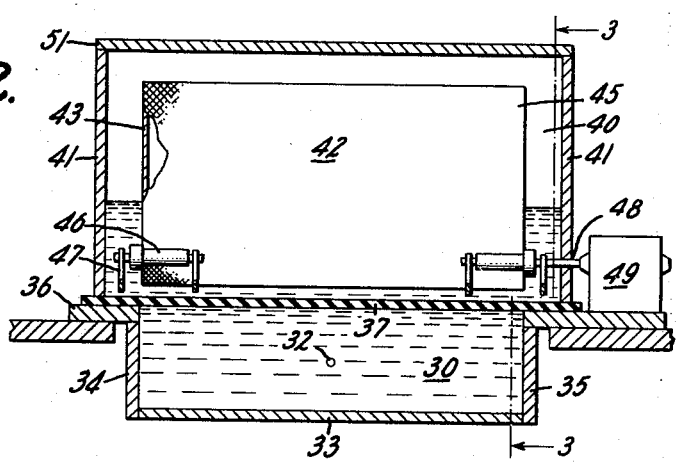
Figure 3:
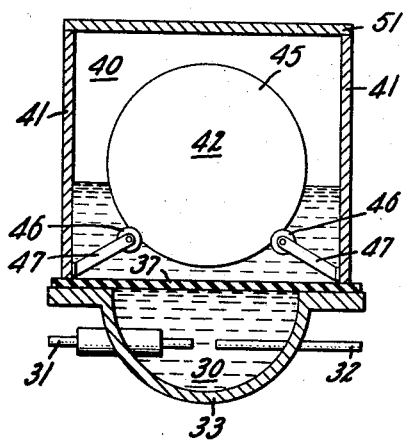

Other and specifically different objects of this invention will become apparent to those skilled in the art from the specific examples disclosed hereinafter with recourse, where applicable to the several drawings in which:

FIG. 1 is a semi-schematic sectional view of apparatus useful in the practice of one embodiment of the invention, FIG. 2 is a semi-schematic sectional view of apparatus useful in the practice of another embodiment of the invention, and FIG. 3 is a sectional view of the apparatus shown in FIG. 2 taken along the line 3—3.

Briefly stated, and in accordance with one aspect of the invention, it has been found that high energy rate shock waves which may be produced in and propagated through relatively incompressible fluid media may be caused to impinge upon composite structures comprising solid materials adhesively bonded to solid material substrates within said fluid media whereby the adhesive bond between the solid materials is ruptured causing the materials to separate. The high energy rate shock waves employed are produced or generated by means of a controlled electrical discharge between spaced electrodes submerged in a dielectric, substantially incompressible fluid media. This means of generating such shock waves has been conveniently termed "electrohydraulics." Typical apparatus and electrical circuitry which may be employed in the practice of electrohydraulic processes have been disclosed for example in application Ser. No. 323,361, entitled "Electrical Circuit for Electrohydraulic Systems," filed in the name of Edward C. Schrom and Ser. No. 323,363, entitled "Electrohydraulic System and Working Fluids Therefor," filed in the name of Edward C. Schrom and Merton Allen both filed on Nov. 13, 1963 and both assigned to the assignee of the present invention.

In order to more particularly disclose the invention, the following specific examples are described:

Removal of soil from fabric

The use of the aforementioned electrohydraulically generated shock wave has been found to effectively clean soiled fabric. One example of the apparatus employed is schematically illustrated in FIG. 1, in which a shock chamber 1 is provided having a bottom 2, sidewalls 3 and 4, and a flange 5. Opposed openings 10 and 11 are provided in side walls 3 and 4 for the accommodation of electrodes 12 and 13, respectively. As shown, electrode 12 is provided with an electrically insulating sleeve or bushing 14. The electrodes 12 and 13 are secured in place and provided with any suitable leak-proof sealing means so that the shock chamber 1 constitutes an open top container capable of retaining a fluid such as water, for example. It will be appreciated that the side walls of chamber 1 may define a compartment having any desired configuration such as rectangular, square, circular, oval, or the like. In the illustrated embodiment, the inner ends 15 and 16 of electrodes 12 and 13 are in spaced, opposed relationship thereby constituting a centrally located spark discharge gap as will be discussed later. The outer ends 17 and 18 of electrodes 12 and 13 are adapted to be connected to an appropriate electrical circuit of the type illustrated, for example, in the previously cited copending patent applications. It will be appreciated that the shock chamber 1 is contemplated as being constructed of a metallic material, such as steel, for example, and that as shown, electrode 13 may be in electrical contact with side wall 4 and be grounded, or electrode 13 may be isolated from the side wall by an insulating sleeve or bushing in the same manner as electrode 12.

Cleaning chamber 20 comprises a tubular structure having side walls 21 and 22 provided with flange 23 and is dimensioned and configured as shown to cooperate with flange 5 of chamber 1. The side walls of chamber 20 desirably define a tubular chamber having the same cross-sectional shape as chamber 1 so that side walls 21 and 22 are substantially coextensive with respect to said walls 3 and 4 and chamber 20 is adapted to be joined to chamber 1 by any conventional means for securing flanges 5 and 23 together. Interposed between flanges 5 and 23 and secured in place by the securing means is an elastomeric imperforate diaphragm 25 which acts as a flexible barrier means separating chamber 1 from chamber 20. Diaphragm 25 may be constructed from an elastomeric material such as neoprene, for example, or from any other suitable similar material. A removable cover 30 may be provided if desired, however, it is not an absolute necessity.

In operation, chamber 1 is completely filled with a substantially dielectric fluid which is substantially incompressible. Normal tap water or water having a low ion content may be employed, however, other liquids having the same equivalent electrical properties and isothermal dimensional stability may be employed. The diaphragm 25 is assembled with flange 5, making sure that no air is entrapped thereby in chamber 1. Chamber 20 is assembled with chamber 1 and diaphragm 25 by means of flange 23 and flanges 5 and 23 are secured together thereby clamping diaphragm 25 in place and forming a seal therebetween. An appropriate amount of the cleaning fluid to be employed is then placed in chamber 20. In this case, tap water may be employed with a small amount of a household detergent, for example. Soiled fabric to be cleaned is then placed in chamber 1. It will be understood that preferably sufficient cleaning fluid is used so that the fabric may be completely submerged. The cover 30 may then be put in place.

Electrohydraulically generated shock waves are then produced in chamber 1 by a spark discharge across the gap between the ends 15 and 16 of electrodes 12 and 13 by means of circuitry as described in the cited copending patent applications. The shock waves generated within chamber 1 are transferred to the cleaning fluid in chamber 20 by means of diaphragm 25 and operate to rupture the adhesive bond between the direct or soil particles and the fabric fibers. The detergent present in the cleaning fluid acts to aid in the disruption of the bond and to hold the dirt particles in suspension in the cleaning fluid to prevent resoiling the fabric.

In order to more clearly disclose this embodiment of the invention, the following test results are shown. For the purpose of evaluating the soil removing capability of the electrohydraulically generated shock wave method and apparatus, standard soil cloth was obtained from United States Testing Company, Inc., referred to hereinafter as U.S.T.C., and from Foster D. Snell, Inc., referred to hereinafter as Snell. These companies are both engaged in industrial research and, among other things, provide the laundry, soap and detergent, and laundry equipment manufacturing industries with textiles which have been purposely soiled in a reproducibly controlled manner so that they can be utilized as standards for the comparative evaluation of detergents, methods, and apparatus for textile cleaning and laundering. The U.S.T.C. cloth is prepared from pure bleached cotton cloth soiled by a formula consisting of carbon black, heavy mineral oil, and refined cotton seed oil. The Snell cloth is also a cotton cloth soiled with a formula consisting of carbon, coconut oil fatty acids, mineral oil and "Bentone 34," a trademark of National Lead Company which is applied to a clay derivative identified as an organic derivative of hydrous magnesium aluminum silicate minerals. Initially, the Snell cloth is darker in color than the U.S.T.C. cloth. The degree of cleaning of these standard soil cloths is conventionally measured by standard reflectometer practice. A number of test switches measuring about 4 in. x 6 in. were cut from both the Snell and U.S.T.C. cloth and placed in tap water in chamber 20. The temperature of the cleaning water in all cases was 50° C. and 75° C. About 0.5 percent by weight of a commercial home laundry type of synthetic detergent was added, the cover 30 applied and a series of shock waves generated by repetitive spark discharges across the spark gap were applied. The shock waves were at the level of 2000 joules the total number of shocks applied at this level were 100 at a repetition rate of 2 shock waves per second. After removal, rinsing, and drying, it was found that the treatment had resulted in uniform soil removal with the percent removal somewhat above that which is normally considered good cleaning in a conventional home laundry cleaning cycle requiring 8 to 9 minutes with the same detergent content and water temperature.

TABLE I.—AVERAGE SOIL REMOVAL

|  | Soil cloth, percent | |
| --- | --- | --- |
|  | U.S.T.C. | Snell |
| Electrohydraulically washed | + 41 | 83 |
| Home laundry tests | 35–40 | 70 |

From the foregoing, it will be seen that under the foregoing stated conditions, cloth may be electrohydraulically laundered to a significantly higher degree of cleanliness in a washing cycle time of less than one minute, compared to the results obtained in a conventional home laundry machine under comparable conditions requiring 8 to 9 minutes.

It should also be noted that in the above-described tests, the test swatches were merely dropped into the cleaning chamber in a random manner with no attempt being made to place them in any particular location with respect to the electrodes or the spark gap. Furthermore, there was no observable damage done to the fabric of any of the swatches by the shock wave treatment. While the foregoing example has been given to illustrate the cleaning of standard test swatches of cloth, it will be appreciated that for cloth which has not been as heavily soiled lower amounts of energy and fewer numbers of shocks may be used. Conversely, stubborn stains may require greater applications of energy and a greater number of shocks.

Removal of food from eating and cooking utensils

In the preparation and consumption of food, remnants of certain foods left on the surfaces of eating and cooking utensils form an adhesive bond which requires hand scouring to remove. Conventional commercial and household dishwashers cannot be relied upon to remove such food deposits as dried egg yolk, dried cooked cereals, and the like, and scouring with abrasive soap powders, steel wool, wire brushes, or the like is needed before the pot, pan, dish, knife, fork, or spoon is washed. It has been found that this adhesive bond can be quickly and efficiently broken by the utilization of electrohydraulically generated shock waves with efficient cleansing of the surfaces of such utensils. As an example of apparatus found to be particularly efficient in the practice of the invention with respect to tableware, such as knives, forks, and spoons, the following description is made with respect to FIGS. 2 and 3 of the accompanying drawing.

Broadly speaking, the apparatus illustrated in FIGS. 2 and 3 for the practice of the invention is similar to that shown in FIG. 1 in that it includes a shock wave generation chamber 30, which is similar in function to chamber 1 of FIG. 1; a cleaning chamber 40, similar in function to chamber 20 of FIG. 1, and a flexible elastomeric diaphragm 37, similar in function to diaphragm 25 of FIG. 1, which separates chamber 1 from chamber 20. Extending into chamber 30 are a pair of opposed electrodes 31 and 32 which are similar in all respects to electrodes 12 and 13 of FIG. 1. In this embodiment, shock wave chamber 30 comprises a semi-cylindrical portion 33 with two end closure members 34 and 35, and the peripheral flange portion 36. The flexible diaphragm member 37 is secured to the flange portion as shown and serves to close the chamber 30 to render it liquid-tight.

As previously discussed with regard to FIG. 1, the shock wave generating chamber is completely filled with a dielectric, substantially incompressible liquid such as tap water, for example.

Cleaning chamber 40 is formed by the upright walls 41 which are secured at their lower portions to flange 36 as shown and forms a rectangular tank-like open top receptacle capable of being partially filled with and containing washing liquid. Removably supported for rotation in cleaning chamber 40 is a cylindrical basket 42 comprised of two circular end members 43 and 44 which may be made of metal sheet or plate material and which serve to support and retain the shape of the circular cylindrically formed basket side wall 45 which is foraminous and may be made from a coarse mesh screen material such as "hardware cloth" or from punched or slotted sheet metal, or the like. It will be understood that access is provided to the interior of the basket by means of any suitable door or closure member, not shown. The drum-like basket 42 is supported for rotation in chamber 40 upon four substantially identical rollers 46, three of which are mounted for rotation upon suitable bearings and brackets 47. The fourth roller is connected by means of a shaft 48 which extends through a suitable packing or gland, not shown, to a driving motor 49, as shown. The motor 49 drives the fourth roller which, by frictional engagement with the periphery of basket 42, causes it to rotate about its longitudinal axis. Rollers 46 may be provided with shoulders or flanges 50, as shown, to prevent undesirable longitudinal motion of the basket during rotation.

In operation, the cooking or eating utensils to be cleaned are placed within basket 42, the basket closed and placed within chamber 40 upon rollers 46, a suitable amount of hot water containing a detergent or soap introduced to chamber 40, and a closure member 51 put in place as shown. It will be appreciated that suitable racks or supports may be incorporated in the interior of the basket 42 if desired or if the nature of the "load" to be cleaned requires it. It has been found, for example, that if the objects to be cleaned are tableware such as knives, forks, and spoons, no interior racks are necessary.

As a more specific disclosure of the invention, the following specific tests were made. Stainless steel eating utensils comprising knives, forks, teaspoons, and tablespoons were deliberately stained with egg, cooked cereal, such as farina, for example, and mixtures thereof. These stains were permitted to dry for times up to about 100 hours, and in some cases the drying was accelerated by placing the utensil upon a hot plate. The basket used was about 10½ inches long and about 6 inches in diameter, formed in one case of ³⁄₁₆ inch thick brass sheet having ⁵⁄₁₆ in diameter holes spaced apart on ½ inch centers and located on a 60° pitch secured to imperforate end members and providing about 28 percent open area. In all the other tests, the basket side wall was formed of standard ¼ inch galvanized hardware cloth having a wire size of 0.016 inch, the basket otherwise having the same dimensions as above. The soiled table utensils were placed in the basket, the basket installed in the treatment chamber and 6.5 gallons of tap water at 61° to 63° C. containing 0.16 percent by weight of a commercially available household detergent was added to the chamber resulting in a water level located approximately at the center line of the basket. The cover was applied and the basket rotated at 29 r.p.m. during the application of electrohydraulically generated shock waves as set forth in the following table.

TABLE II

| Test No. | Joules per shock | Capacity μ | Voltage, kv. | Initial spark gap (inches) | Shocks per second | Total shocks | Soil drying time (hours) |
|---|---|---|---|---|---|---|---|
| 1 | 337 | 27 | 5.0 | 0.070 | 4 | 1,200 | 2 |
| 2 | 450 | 9 | 10.0 | 0.118 | 5 | 800 | 12+ |
| 3 | 729 | 18 | 9.0 | 0.200 | 4 | 1,200 | 4 |
| 4 | 729 | 18 | 9.0 | 0.200 | 4 | 600 | 4 |
| 5 | 729 | 18 | 9.0 | 0.200 | 4 | 600 | 4 |
| 6 | 729 | 18 | 9.0 | 0.200 | 4 | 600 | 4 |
| 7 | 729 | 18 | 9.0 | 0.200 | 4 | 1,200 | 4 |
| 8 | 729 | 18 | 9.0 | 0.200 | 4 | 600 | 4 |
| 9 | 729 | 18 | 9.0 | 0.200 | 4 | 1,200 | 4 |
| 10 | 729 | 18 | 9.0 | 0.200 | 2.5 | 1,200 | ~100 |
| 11 | 729 | 18 | 9.0 | 0.200 | 2.5 | 1,200 | ~100 |

It should be noted at this point that in test number 1, the basket contained 40 soiled soupspoons; in test number 2, there were 60 utensils comprising 15 each of knives, forks, teaspoons and soupspoons; test 5, 36 knives; tests 3, 4, and 10, 36 soupspoons; and tests 6, 7, 8, 9, and 11, 36 teaspoons. Also, in tests 1 and 2, a Dacron fiber-Dacron film diaphragm was used; in test 3, a ¹⁄₁₆ inch thick neoprene rubber diaphragm was used; and in the remaining tests, a ⅛ inch thick neoprene diaphragm was used. In all these tests, the soil was removed from the utensils. From the foregoing, it will be appreciated that cleaning of these very stubborn dried food residues was accomplished according to this invention in times ranging from 2.5 to 8 minutes and with soil removed more completely than in standard home dishwashing machines. Similar tests performed on soiled tableware, except that the basket was not rotated, produced satisfactory cleaning where the surface to be cleaned was located in line of sight with respect to the diaphragm. Where there was an intervening body between the surface and the diaphragm, cleaning was impaired.

Stripping of electroplated metal deposits from cathodes

In the recovery of certain metals from metal scrap or from their ores, a process referred to as "electrowinning" is employed. Electrowinning involves the leaching of the ore as scrap material to effect solution of metal values therefrom, purification of the solution where necessary, followed by the electrolytic precipitation of the metal on a cathode. The metal is then separated from the cathode and the cathode reused. Metals currently commercially produced by electrowinning techniques include copper, zinc, antimony, cobalt, chromium, iron, gallium, manganese, and silver. A more complete discussion of electrowinning may be found in "Electrochemical Engineering," Mantell, McGraw-Hill Book Company, 4th edition (1960), pages 198 to 247. In many of these processes, removal of the deposited metal without damage to the cathode or excessive fragmentation of the deposit poses considerable problems.

In the electrowinning of copper, the copper is electroplated out of the electrolyte upon a copper "starting blank" about ¼ inch thick. Copper starting blanks are used for a number of reasons, not the least being to avoid contamination of the electrolyte with other metal ions and avoiding chemical attack by the electrolyte on the starting blank. It is desirable to remove the deposited copper after it has attained a thickness of about ¹⁄₁₆ inch from each of the major starting blank surfaces as a single sheet so that it can be used in turn as a "starting sheet" to form thicker bodies of the order of 2 inches to 4 inches thick, all composed of electrolytically deposited copper which are referred to in the art as "cathodes." In practice, the electroplated copper coatings on the starting blank usually are stripped therefrom by hand. The hand stripping operation requires considerable skill to avoid damaging or bending the stripped copper coating and, hence, is a time-consuming expensive operation.

Such copper starting sheets have been successfully separated as single sheets from commercially supplied copper starting blanks utilizing electrohydraulically generated shock waves without bending or otherwise damaging either the starting blank or the starting sheet. The apparatus employed was substantially identical to that shown in FIG. 1 of the drawing except that the flexible diaphragm 25 was omitted. The copper plated starting blanks were positioned submerged under tap water in the tank with the plane of the blank arranged substantially vertical and parallel to the common axis of the electrodes. The following tabular data are exemplary of the conditions under varying conditions where successful separation was achieved.

More particularly, a number of stainless steel cathodes measuring 18 inches by 36 inches by about $\frac{1}{32}$ inch thick having both major surfaces coated with electrodeposited manganese about $\frac{1}{8}$ inch thickness were subjected to electrohydraulically generated shock waves in apparatus as previously described with respect to the removal of copper. Satisfactory stripping was accomplished at 1944 joules per discharge (27 microfarads, 12,000 volts). In all cases, a $\frac{3}{16}$ inch spark gap between the electrodes was used, tap water was used as the fluid medium, a total of 15 discharges was employed at a rate of three per second, and stripping was accomplished from both sides of the stainless steel cathodes simultaneously without producing any observable bending, deformation, or other damaging of the cathode plates. Two plates were stripped simultaneously by placing one plate on each side of the electrode gap. Furthermore, such plates have been stripped of manganese utilizing fewer numbers of shocks. For example, a single shock wave

TABLE III

| Test No. | Joules per shock | Capacity μ | Voltage, kv. | Shocks per second | Total shocks | Size (inches) | Parting compound |
|---|---|---|---|---|---|---|---|
| 1 | 3,240 | 45 | 12 | 1.5 | 50 | 18 x 18 | No |
| 2 | 1,944 | 27 | 12 | 4.0 | 25 | 15 x 15 | Yes |
| 3 | 1,633 | 27 | 11 | 3.5 | 50 | 15 x 15 | Yes |

As indicated, a thin film of a parting compound is sometimes applied to the surfaces of the starting blank. The above data shows that the absence of such coatings does not prevent efficient separation.

Electrowon zinc is deposited upon cathodes made from aluminum or aluminum alloy plates. In most cases, it is desirable to separate the zinc layer which may be as much as $\frac{1}{4}$ inch thick or more from each major surface of the cathode.

Whereas it is necessary to strip the copper starting sheet from the starting blank without bending or otherwise damaging either, in the electrowinning of zinc, bending or damage to the zinc is relatively unimportant, but bending or damage of the aluminum cathode (corresponding in function to the copper starting plate) is undesirable.

Electrohydraulically generated shock waves have been successively employed for the stripping of electrowon zinc from aluminum cathodes in apparatus and in the manner described with respect to the stripping of copper, supra, and as set forth in the following table.

TABLE IV

| Test No. | Joules per shock | Capacity, μf. | Voltage kv. | Shocks per second | Total shocks | Size (in.) |
|---|---|---|---|---|---|---|
| 1 | 3,240 | 45 | 12 | 1.5 | 50 | 18 x 18 |
| 2 | 1,944 | 27 | 12 | 3.0 | 25 | 18 x 18 |
| 3 | 648 | 9 | 12 | 7.0 | 40 | 3 x 5 |
| 4 | 1,944 | 27 | 12 | 3.0 | 25 | 12 x 14 |

In none of these cases had the aluminum cathodes been treated with a parting agent.

In the electrowinning of manganese, the metal is usually deposited as a brittle layer about $\frac{1}{32}$ inch thick or more upon stainless steel sheet cathodes about $\frac{1}{32}$ inch thick. Under present practice, the brittle deposit is removed by passing the cathode sheets through a rolling mill which bends the steel sheet, cracking the manganese off as irregularly shaped platelets. After the manganese is removed, the cathode sheets must be carefully "levelled" or flattened before they are placed back in the electrolyte in order to avoid excessive "treeing" and consequent inefficiency in deposition and possible cell damage from occurring.

having an energy level of 4410 joules has been satisfactorily employed. Also, electrodeposited manganese has been separated successfully from aluminum plate cathodes measuring 5 by 7 inches by electrohydraulic means.

The metal antimony is similar electrowon and steel electrode plates bearing layers of electrodeposited antimony have been successfully stripped by similar electrohydraulic techniques. For example, about $\frac{1}{8}$ inch thick steel electrodes comprising sheets $16\frac{1}{2}$ inches by $17\frac{1}{2}$ inches having an electrodeposited coating of antimony about $\frac{1}{4}$ inch in thickness on both major surfaces were successfully stripped by exposure to 15 shock waves of 2281 joules each generated by a discharge of 13 kv. and 27 microfarads. Similar electrodeposits of antimony were stripped from such electrode plates using 50 shocks of 450 joules generated by a discharge of 10 kv. and 9 microfarads.

Cleaning of castings

In the production of metal castings by conventional sand foundry techniques, after the molten metal has solidified, the casting is "shaken out" of the molding sand and flask, usually by agitation on moving screens or metal bars. This semi-automatic treatment is rarely effective to remove core sand from interior pockets or recesses, sand which is adhesively attached to the surface of the casting, and adherent bodies of sand into which molten metal has penetrated, sometimes referred to as "burnt sand" or "penetrated metal." Core sand and loosely adhering surface sand may be removed by high velocity jets of water or by sand blasting or other similar methods but penetrated metal usually has to be manually ground or chipped off. In any event, these more or less conventional casting cleaning methods are expensive and time-consuming. It has been found that electrohydraulically generated shock waves are effective to remove adherent sand, break up and remove cores or remnants of cores, and to remove penetrated metal from metal castings quickly, effectively, and economically.

More specifically, it has been found that automobile cylinder head castings may be cleaned of sand by subjecting the castings to repetitive exposure to electrohydraulically generated shock waves in water. For example, three to four discharges of 500 joules at 10,000 volts each were found to be sufficient to remove the outer surface adherent sand, and after the sand crust on the valve seat portions were broken, a few more discharges were capable of cleaning out the interior portions. The water cooling chambers required up to about 20 total discharges to clean. The equipment used comprised an open top tank large enough to contain the casting ad sufficient water to cover the casting and electrode of the type shown in FIG. 1 of patent application Ser. No. 323,362, to E. C. Schrom, entitled "Electrode," filed Nov. 13, 1963, and assigned to the assignee of the present invention and utilizing electrical circuitry of the type shown in FIG. 3 of the application.

From the foregoing examples, it will be apparent to those skilled in the art that a great many other similar applications of electrohydraulically generated shock waves in a dielectric substantially incompressible liquid are feasible such as, for example, paint removal from solid substrates, descaling of ship hulls, cleaning the interior walls of tanks or other containers, and many other applications which involve breaking or rupturing the adhesive bond which secures a solid material to a solid substrate. It will be appreciated that the foregoing specific examples are to be viewed as solely for the purpose of rendering a more complete disclosure and are not intended to limit the broad scope of the invention. While for simplicity of disclosure, the apparatus illustrated has been shown to embody a single pair of spaced electrodes to define a spark gap, it will of course be appreciated that multiple pairs of such electrodes may be used if desired, or that co-axial electrodes of the type disclosed in application Ser. No. 323,362, previously referred to, or in application Ser. No. 429,817, filed Feb. 2, 1965, in the name of M. Allen, entitled "Electrohydraulic Process," and assigned to the assignee of the present invention may be used.

Furthermore, it will be appreciated that other and specifically different geometrical shapes from those illustrated in the drawings may be used. Also, the fluids used in the tanks, both to discharge the electrohydraulic energy in and the fluid in contact with the workpiece may be circulated by some external means such as a pump or a pump and reservoir system in place of the self-contained static systems illustrated. Also, if desired, the workpieces may be conveyed into and out of the tank in a substantially continuous manner instead of operating on a batch basis as illustrated.

What we claim as new and desire to secure by Letters Patent of the United States is:

1. A method for the separation of a solid material adhesively bonded to a solid substrate from said substrate without damaging said substrate in which said solid material comprises a metal coating electrolytically deposited upon said substrate which comprises a metal cathode, comprising the steps of submerging said substrate with said electrolytically deposited coating adhesively bonded thereto in a substantially incompressible liquid and propagating high energy rate shock waves by electrohydraulic means in said liquid which impinge upon said adhesively bonded electrodeposited coating to rupture said adhesive bond, said shock waves being generated by means of an electric spark discharge between spaced electrodes submerged in an substantially incompressible dielectric liquid and communicated via said substantially incompressible liquid to said electrodeposited coating, said discharge having an energy in excess of about 300 joules.

2. The method recited in claim 1 in which said solid material comprises copper electrodeposited upon a copper cathode.

3. The method recited in claim 2 in which said high energy shock waves comprise a plurality of such waves generated by repeated electric spark discharges.

4. The method recited in claim 1 in which said solid material comprises zinc electrodeposited upon an aluminum cathode.

5. The method recited in claim 4 in which said high energy shock waves comprise a plurality of such waves generated by repeated electric spark discharges.

6. The method recited in claim 1 in which said solid material comprises manganese electrodeposited upon a ferrous metal cathode.

7. The method recited in claim 6 in which said high energy shock waves comprise a plurality of such waves generated by repeated electric spark discharges.

8. The method recited in claim 1 in which said solid material comprises antimony electrodeposited upon a ferrous metal cathode.

9. The method recited in claim 8 in which said high energy shock waves comprise a plurality of such waves generated by repeated electric spark discharges.

References Cited

UNITED STATES PATENTS

| | | | |
|---|---|---|---|
| 2,616,820 | 11/1952 | Bourgeaux | 148—6.15 |
| 2,750,333 | 6/1956 | Smart. | |
| 2,828,114 | 3/1958 | Raudszus | 261—33 |
| 2,888,939 | 6/1959 | Mitsche. | |
| 2,910,390 | 10/1959 | Gruettner et al. | 134—1 |
| 2,989,965 | 6/1961 | Rod | 134—46 |
| 3,002,731 | 10/1961 | Gelfand et al. | 259—1 |
| 3,098,019 | 7/1963 | Pagel | 204—114 X |
| 3,103,474 | 9/1963 | Juda | 204—104 |
| 3,117,768 | 1/1964 | Carlin | 259—72 |
| 3,180,418 | 4/1965 | MacLeod | 166—43 |
| 3,234,047 | 2/1966 | Olson | 134—20 |

FOREIGN PATENTS

| | | |
|---|---|---|
| 557,719 | 5/1958 | Canada. |
| 506,538 | 9/1930 | Germany. |
| 140,500 | 3/1951 | Great Britain. |
| 548,960 | 10/1942 | Great Britain. |

OTHER REFERENCES

Jacobs et al.: "Production of Manganese," Metal Industry, Dec. 8, 1944, pp. 358–360.

DENNIS E. TALBERT, JR., Primary Examiner

U.S. Cl. X.R.

68—3; 134—12, 32, 85, 140, 147; 204—3; 259—1